(12) United States Patent
Siciliano et al.

(10) Patent No.: US 9,339,121 B2
(45) Date of Patent: May 17, 2016

(54) INVENTORY SYSTEM AND METHOD FOR THE PREVENTION OF SCRATCH-OFF LOTTERY TICKET THEFT

(71) Applicants: Michael Siciliano, West Palm Beach, FL (US); Michele P Burns, Delray Beach, FL (US)

(72) Inventors: Michael Siciliano, West Palm Beach, FL (US); Michele P Burns, Delray Beach, FL (US)

( * ) Notice: Subject to any disclaimer, the term of this patent is extended or adjusted under 35 U.S.C. 154(b) by 325 days.

(21) Appl. No.: 13/964,939

(22) Filed: Aug. 12, 2013

(65) Prior Publication Data
US 2014/0046481 A1  Feb. 13, 2014

Related U.S. Application Data

(60) Provisional application No. 61/682,439, filed on Aug. 13, 2012.

(51) Int. Cl.
| | |
|---|---|
| *G06F 17/00* | (2006.01) |
| *A47F 1/04* | (2006.01) |
| *G08B 13/14* | (2006.01) |
| *G07F 11/00* | (2006.01) |
| *B65D 83/12* | (2006.01) |
| *G06Q 10/08* | (2012.01) |
| *G07D 11/00* | (2006.01) |
| *A47F 1/12* | (2006.01) |
| *A47F 3/00* | (2006.01) |
| *G07F 9/02* | (2006.01) |

(52) U.S. Cl.
CPC . *A47F 1/04* (2013.01); *A47F 1/125* (2013.01); *A47F 3/002* (2013.01); *B65D 83/12* (2013.01); *G06Q 10/087* (2013.01); *G07D 11/0072* (2013.01); *G07D 11/0078* (2013.01); *G07F 9/026* (2013.01); *G07F 11/002* (2013.01); *G08B 13/14* (2013.01); *B65D 2203/06* (2013.01); *G08B 13/1481* (2013.01)

(58) Field of Classification Search
CPC .................................. B65D 7/24; B65D 83/12
See application file for complete search history.

(56) References Cited

U.S. PATENT DOCUMENTS

| | | | | | |
|---|---|---|---|---|---|
| 4,716,799 | A | * | 1/1988 | Hartmann | B26D 5/32 226/24 |
| 4,982,337 | A | * | 1/1991 | Burr | G06Q 50/34 221/7 |
| 5,408,417 | A | * | 4/1995 | Wilder | G06Q 10/02 235/381 |
| 6,029,851 | A | * | 2/2000 | Jenkins | G07F 7/06 221/102 |
| 6,351,688 | B1 | * | 2/2002 | Nichols | G06Q 20/202 700/236 |
| 7,263,411 | B2 | * | 8/2007 | Shows | G06F 19/3462 221/2 |
| 7,383,099 | B2 | * | 6/2008 | Pollard | G07F 17/32 221/125 |
| 8,554,365 | B2 | * | 10/2013 | Thomas | G06F 19/3462 700/236 |
| 2002/0162850 | A1 | * | 11/2002 | Yuyama | B65B 5/103 221/124 |
| 2003/0120381 | A1 | * | 6/2003 | Perin, Jr. | G07F 9/026 700/232 |
| 2003/0204288 | A1 | * | 10/2003 | Scrymgeour | G07B 5/00 700/236 |
| 2011/0087369 | A1 | * | 4/2011 | Bauer | A47F 1/04 700/232 |

* cited by examiner

*Primary Examiner* — Prasad Gokhale
(74) *Attorney, Agent, or Firm* — The Ollila Law Group LLC (57) ABSTRACT

A system for monitoring inventory for scratch-off lottery tickets to simplify tracking inventory and aid in theft prevention. A computing device communicates with lockable metal ticket dispensers to maintain real-time inventory of product and display product inventory on the product dispensers. Dispensers log ticket inventory information and the identity of users associated with ticket dispensing.

13 Claims, 7 Drawing Sheets

INVENTORY SYSTEM AND METHOD FOR THE PREVENTION OF SCRATCH-OFF LOTTERY TICKET THEFT

CROSS-REFERENCE TO RELATED APPLICATION

This application claims priority to U.S. Provisional Patent Application Ser. No. 61/682,439 filed on Aug. 13, 2012 titled "Point of Sale and Inventory System and Apparatus for the Prevention of Item Theft," which is incorporated by reference herein in its entirety.

FIELD OF THE INVENTION

The present invention relates to the field of inventory management and, more particularly, to an inventory and dispensation system and related methods for the prevention of scratch-off lottery ticket theft.

BACKGROUND

Lottery tickets are popular items often offered for sale by convenience stores, grocery stores, and other outlets. "Scratch off" tickets (also known as pre-printed or instant win tickets, but hereinafter may be referred to simply as "tickets") are amongst the most popular style of game play. Scratch off tickets are pre-printed, typically on relatively heavy paper stock, and have a game play region that is covered from view by a coating that is easily scratched or rubbed from the ticket to reveal the printed surface below. The printed game play region exposed after removing the coating indicates whether the purchaser of the ticket has won the game as dictated by the rules of the ticket. A winning ticket is typically redeemable for cash and/or prizes.

Tickets are typically chronologically numbered, barcoded, and come in perforated fan-fold streams or rolls. Ticket streams are generally "inactive" upon delivery to a retail outlet. The retailer activates the stream prior to sale. This not only renders each ticket in the stream "live" so that the ticket may be redeemed for cash or prizes, but also makes the retailer liable for loss or theft of the tickets in the activated stream.

Although scratch off tickets provide a source of revenue to retail outlets, they are also a popular theft target due to the potentially great value inherent in a winning ticket. Since scratch off tickets are such desired objects of theft, the risk of lost revenue to a retailer is great. Since a fan-fold stream may contain hundreds of tickets and a particular location may offer dozens of different scratch off games, the number of activated tickets may reach the thousands, creating a potentially large liability. Therefore, the ever-present task of theft prevention is a burden shared by retailers of such items.

It is estimated that up to 40% of convenience store theft is attributable to loss of small, yet potentially valuable, items such as scratch-off tickets. Since tickets are typically stored behind the check-out counter, away from the reach of the typical shopper, it is accepted that employee theft accounts for much of these losses.

To steal scratch-off tickets from a ticket stream, employees have devised schemes to facilitate theft and avoid detection. For example, employees may steal the last few tickets in the stream. By the time the stream of tickets is exhausted, there is no way to attribute the loss to a particular employee. Similarly, tickets taken from the middle of a stream (the ticket stream may be reconnected with tape or a similar adhesive) are only discovered as missing well past the theft event making detection and attribution extremely difficult.

To avoid on-camera detection of theft, employees can, for example, simply charge an accomplice customer for a single ticket and hand off multiple tickets to his accomplice.

In order to deter employees from stealing these items, inventory tracking is employed by businesses to reduce shortages. However, when a store has thousands of individual tickets to track, the task of manually maintaining inventory from employee shift to employee shift becomes an almost insurmountable task. Even with a relatively efficient system in place, a manual count of such a large inventory typically takes 15 to 30 minutes to complete. With multiple employees and multiple shifts in a day, the cost incurred to pay these employees wages attributable to inventory tracking is substantial, and may even exceed the cost of the loss prevented by such manual reconciliation.

Often, cash registers utilize electronic methods of inventory tracking based on sales executed, but there are typically no physical measures in place that appreciably reduce theft. In particular, a theoretical inventory is typically tracked by the register, but the actual physical inventory is not accounted for in real-time. Manually keeping a physical inventory is costly, time consuming, and prone to inaccuracy, yet not well suited to prevent employee theft, as ticket dispensers are typically unsecured containers that are easily accessible by any employee.

A fully automated system, such as a vending machine, is not an appropriate solution to such a problem since the nature of lottery products is subject to regulations regarding the age of the purchaser. Human age verification is a vital aspect of sales of such goods. Additionally, such systems often do not give customers cash change, or at least can not provide large amounts of cash change. Also, customers often exchange winning tickets for the cash-equivalent of additional tickets. Lastly, vending machines are bulky, typically being too large for on-counter or behind-the-counter placement.

Therefore, there is a need for a secure scratch-off ticket dispenser that tracks and displays ticket inventory. There is a need for a dispenser that only dispenses tickets upon receiving an electronic signal to do so. There is a further need for a ticket dispenser that displays the inventory of the tickets secured within the dispenser. Additionally, there is a need for a dispenser that creates inventory and sales reports that reflect the actual number of tickets dispensed from a dispenser.

SUMMARY OF THE INVENTION

The system of the present invention provides a scratch-off lottery ticket dispensing system that aids in the prevention of ticket theft. A lockable ticket compartment dispenses tickets upon receipt of a dispense trigger signal, and the ticket inventory of the compartment is updated in real-time.

A computing device is configured to send and receive signals to the ticket dispenser, wherein at least one of the signals is the dispense trigger. The ticket dispenser has a lockable ticket compartment dimensioned to house a plurality of tickets. Each ticket compartment has a slot sized to allow at least one ticket to pass through it.

Inside the ticket compartment resides a dispensing mechanism and an associated motor that actuates the dispensing mechanism. The dispensing mechanism is configured to advance at least one of the plurality of tickets from within the ticket compartment, through the slot, to the exterior of the ticket dispenser. In one embodiment, the lockable ticket compartment is configured to house a continuous perforated fan fold of scratch off lottery tickets.

A logic circuit is in communication with the motor, and is configured to control motor actuation. Additionally, memory with the logic circuit records the number of tickets advanced to the exterior of the ticket dispenser. There is also an interface with the logic circuit that receives the dispense trigger and actuates the motor so to dispense a ticket to the exterior of the ticket dispenser upon receipt of the trigger.

The exterior of the ticket dispenser has a numeric display that indicates the number of tickets remaining in the lockable ticket compartment. A second interface with the logic circuit communicates with the memory and the numeric display to control the display.

In a related embodiment, the ticket dispenser comprises a plurality of lockable ticket compartments. The housing of the ticket compartment is made of metal to reduce unauthorized access to the dispenser's interior. In another embodiment, the ticket compartment comprises a movable compartment divider to accommodate different ticket dimensions.

In one embodiment, each one of the plurality of lockable ticket compartments comprises an associated numeric display disposed on the exterior of the ticket dispenser, and each associated numeric display is configured to indicate the number of tickets remaining in an associated ticket compartment. This inventory information, in a related embodiment, further comprises an interface to communicate the ticket inventory of the ticket dispenser to a network.

In a variation of the above system, the scratch-off lottery ticket dispensing system comprises a computing device configured to record the number of tickets sold. The ticket dispenser is configured to communicate the number of tickets remaining in the lockable ticket compartment to the computing device. Additionally, the computing device is configured to log a ticket dispensation report, which is optionally printed and/or sent to a network. The computing device is configured to record: a ticket sale, a value indicating number of tickets sold, the identification credentials of the computing device user, an indication of the type of tickets sold, and a time stamp indicating when the tickets were sold.

In yet another embodiment of the invention, a scratch-off lottery ticket dispensing system comprises a lockable ticket dispenser having a plurality of ticket compartments, each having a size and dimension to securely contain and dispense tickets contained therein. A numeric display is associated with each ticket compartment, and each numeric display is disposed on the exterior of dispenser. Each numeric display is configured to indicate the number of tickets remaining in its associated ticket compartment.

Each numeric display comprises at least one light emitting diode. However, a single computing device can display each numeric display. The ticket dispenser is configured to dispense a ticket upon receipt of a trigger signal. A computing device, which preferably has a touch screen interface, is configured to send the trigger signal. The computing device is also configured to record at least one of: ticket sales; quantity of tickets sold; the identity of the type of tickets sold; the unique identifier of a particular ticket sold; the identification credentials of the computing device user; and the time stamp indicating when the tickets were sold.

The present invention also presents a method of tracking scratch-off lottery ticket inventory comprising the steps of: providing a lockable ticket dispenser comprising a plurality of ticket compartments having a size and dimension to securely contain and dispense tickets from a continuous perforated fan fold of scratch off lottery tickets contained therein; providing a numeric display for each ticket compartment, each numeric display disposed on an exterior of the lockable automated ticket dispenser, each numeric display configured to indicate the number of tickets of an associated ticket compartment; simultaneously displaying the number of tickets contained in each ticket compartment. The step of sending the number of tickets displayed on the numeric display to a network is also contemplated.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION

In the Summary above and in the Detailed Description, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

The term "comprises" is used herein to mean that other ingredients, steps, etc. are optionally present. When reference is made herein to a method comprising two or more defined steps, the steps can be carried in any order or simultaneously (except where the context excludes that possibility), and the method can include one or more steps which are carried out before any of the defined steps, between two of the defined steps, or after all of the defined steps (except where the context excludes that possibility).

In this section, the present invention will be described more fully, in which preferred embodiments of the invention are detailed. This invention may, however, be embodied in many different forms and should not be construed as limited to the embodiments set forth herein. Rather, these embodiments are provided so that this disclosure will be thorough and complete, and will convey the scope of the invention to those skilled in the art.

In view of the foregoing background, it is therefore an object of the present invention to provide a scratch-off lottery ticket dispenser apparatus and related method to maintain an accurate inventory and to prevent theft of tickets.

This and other objects, features, and advantages in accordance with the present invention are provided by a lockable lottery ticket dispenser that secures tickets and maintains real-time electronic inventories. Inventory is displayed and inventory reports are printed or transferred to other computing devices.

Scratch-Off Lottery Ticket Dispenser

Figure 1:
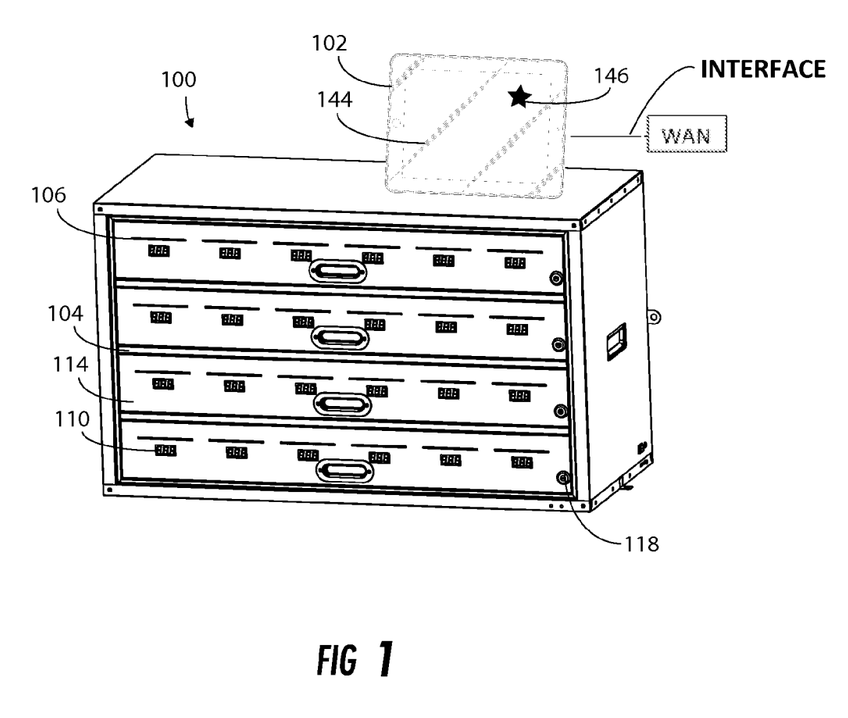
FIG. 1 illustrates one embodiment of the invention.
Figure 2:
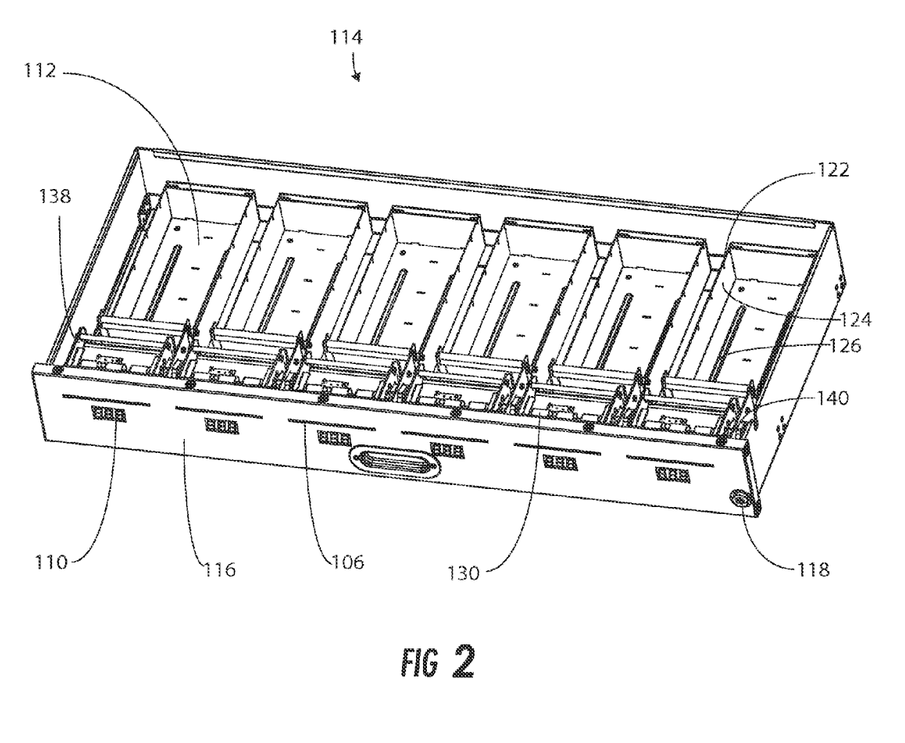
FIG. 2 illustrates an embodiment of a ticket drawer.

With reference to FIG. 1, the Scratch-off lottery ticket dispenser 100 contemplated by the invention electronically communicates with a computing device 102. The ticket dispenser 100 is of a size and dimension to accept a plurality of scratch-off lottery ticket rolls or perforated fan-fold streams. The dispenser 100 is lockable to prevent access to tickets by unauthorized personnel. The construction is preferably from metal to aid in resisting forced intrusion. In a preferred embodiment of the invention, the computing device 102 is a tablet computing device (such as an iPad®, Android device, or similar tablet computer). However, any computing device 102 having a keyboard, pointing device, or touch screen interface is contemplated by the invention.

Communication between the dispenser 100 and the computing device 102 is preferably effectuated by a direct connection, but wired or wireless communication is also contemplated, such as through, for example without limitation, WiFi, Bluetooth, or a local or wide area network.

With continuing reference to FIG. 1, in a preferred embodiment of the ticket dispenser 100 the outside face 104 of the dispenser comprises a plurality of slots 106 through which scratch-off lottery tickets 108 (see FIG. 3) are fed. Tickets are fed from within the dispenser 100 through an adjacent slot 106 to the exterior of the dispenser 100.

Turning to FIGS. 1-4, in a preferred embodiment of the ticket dispenser 100, a numeric display 110 is proximate each slot 106. The numeric display 110 is either mechanical (such as an odometer-type counter) or digital (such as a series of seven-segment LED displays or an LCD screen). The numeric displays 110 indicate the actual quantity of tickets 108 of a particular type remaining in a compartment 112 or the dispenser 100.

Figure 3:
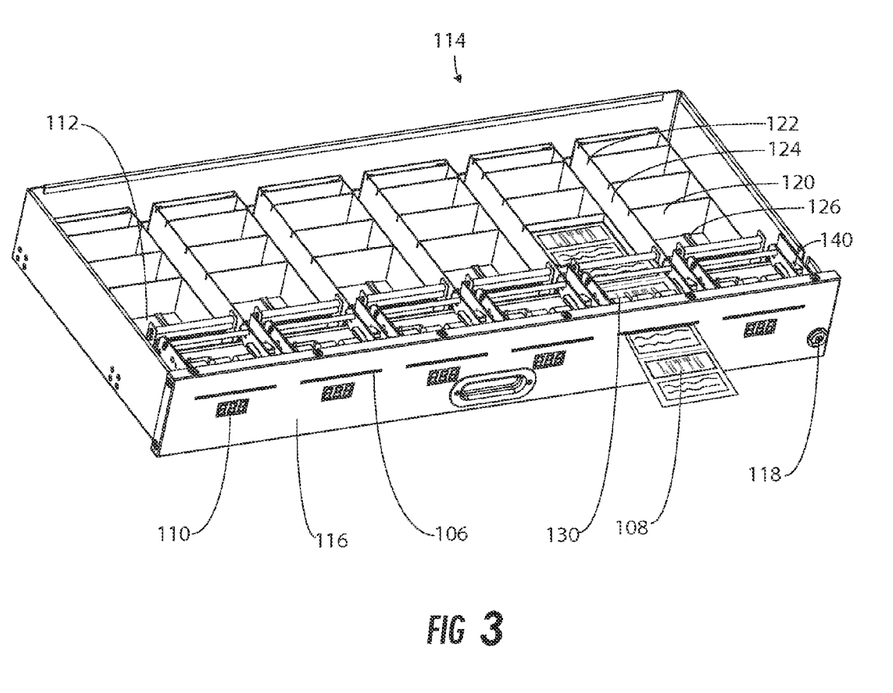
FIG. 3 illustrates another embodiment of the ticket drawer wherein one compartment is populated with scratch-off lottery tickets.
Figure 4:
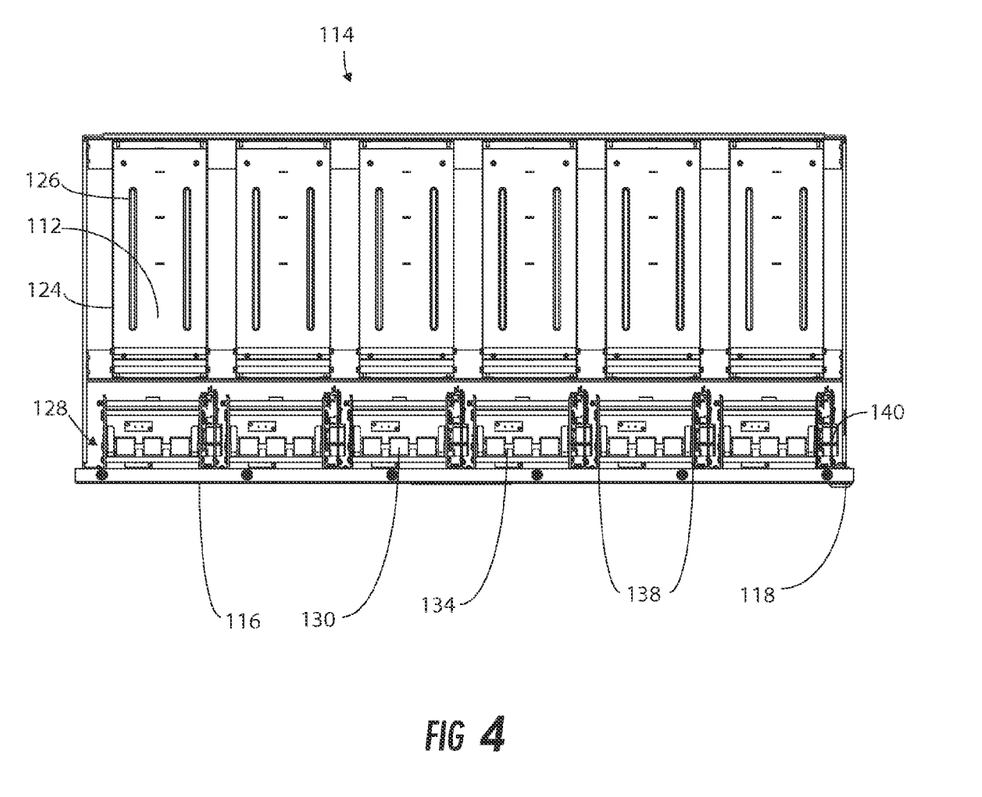
FIG. 4 illustrates a top view of the ticket drawer illustrated in FIG. 2.

In one embodiment of the invention, the ticket dispenser 100 comprises at least one drawer 114. The face 116 of each drawer 114 preferably defines the slots 106 and also has the numeric displays 110 visible therefrom. The drawers 114 are lockable to the dispenser 100 to prevent theft of tickets 108. In one embodiment, a lock 118 is installed on each drawer 114. However, a single lock 118 to lock all drawers 114 of a dispenser 100 is also contemplated. For additional security, the entire dispenser is optionally permanently mounted to a wall, floor, countertop, or similar surface. Each drawer 114 comprises at least one compartment 112. Each compartment 112 is sized and dimensioned to hold a fanfold or roll of tickets 108. In one embodiment, as illustrated by FIG. 3, dividers 120 are installed in each compartment 112 to adjust the size of the compartment 112 so that a fan fold of tickets 108 snugly fits within the compartment 112. Since scratch-off lottery tickets 108 are available in different sizes, the dividers 120 allow tickets 108 of differing sizes to be compatible with the compartment 112. In one embodiment, dividers 120 engage slots 122 in compartment walls 124. This secures the dividers 120 in place until they are manually repositioned. In a related embodiment (not illustrated), a single sliding divider with each compartment 112 is disposed on at least one rail 126, wherein the sliding divider's position is changeable along the length of the rail 126 to accommodate a wide size range of tickets 108.

Figure 5:
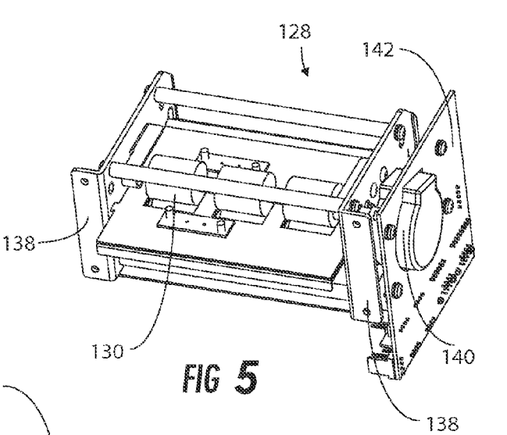
FIG. 5 illustrates a perspective view of one embodiment of a feed mechanism.
Figure 6:
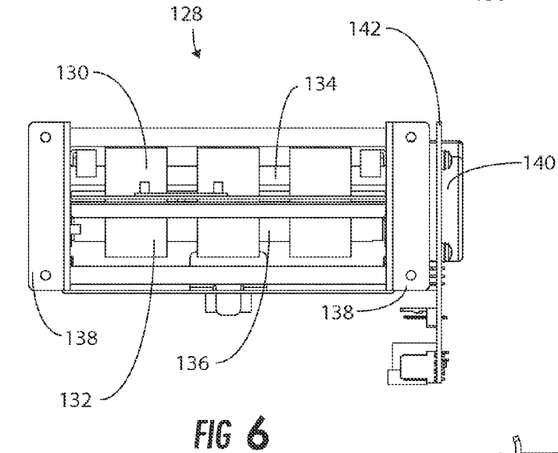
FIG. 6 illustrates a front view of the feed mechanism illustrated in FIG. 5.
Figure 7:
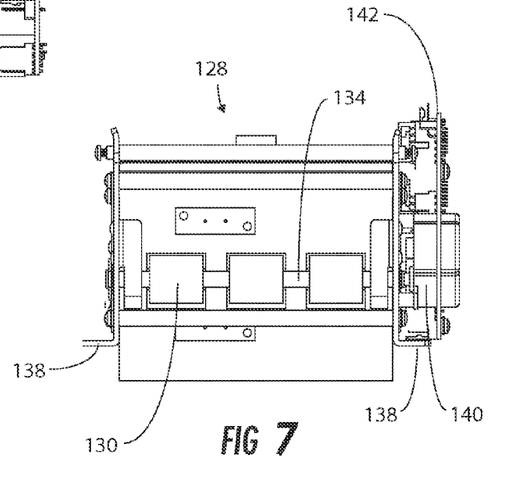
FIG. 7 illustrates a top view of the feed mechanism illustrated in FIGS. 5 and 6.

Turning to FIGS. 5-7, the compartments 112 each have a dedicated feed mechanism 128. In a preferred embodiment, the feed mechanism 128 comprises top rollers 130 and bottom rollers 132 that are each arranged to frictionally engage tickets 108. The rollers 130, 132 are each preferably mounted to a respective top rotatable shaft 134 and bottom rotatable shaft 136. In a related embodiment, the shafts 134, 136, are attached to plates 138 of the feed mechanism. When the rollers 130, 132 rotate, tickets 108 are fed by and through the rollers 130, 132 through the slot 106, and dispensed to the exterior of the dispenser 100. A motor 140 engages at least one shaft 134, 136 and causes at least one roller 130, 132 to rotate under power from the motor. In one embodiment, the top rollers 130 are attached to the motor 140 by the top shaft 134 and the bottom rollers 132 are disposed to spin freely. In one embodiment, the rollers 130, 132 comprise a ratcheting mechanism that only allows the tickets 108 to travel in the direction of dispensing.

The rollers 130, 132 are made of a material that acts to promote a frictional grip with the tickets 108 such as rubber, latex, nitrile, silicone, methyl vinyl silicone, phenyl methyl silicone, platinum cure silicone, fluorocarbon elastomer, perfluorinated elastomer, acrylate, nitrile, hydrogenated nitrile butadiene rubber, and any other relatively compliant material known in the art. Materials may also be chosen such as plastics, high density polyethylene, low density polyethylene, polyethylene terephthalate, Nylon, Polystyrene styrenic block copolymer, thermoplastic polyester elastomer, aliphatic polyether-based thermoplastic polyurethane, elastomeric thermoplastic polyurethane, polyolefins, polyamide nylon, metallocene polyethylene resins, polyether block amide, polyvinyl chloride, polyurethane, polypropylene, polyoxymethylene, polystyrene, post-consumer resin, K-resin, epoxy resin, phenolic formaldehyde resin, stainless steel, aluminum, other metals, ceramic, glass, and any other material known in the art.

FIGS. 5-7 illustrate closer views of an embodiment of a feed mechanism 128. The motor 140 connects to a circuit board 142. The circuit board 142 is, in a preferred embodiment, a connector that drives the motor 140 and connects the motor 140 to the computing device 102 to receive signals therefrom. The circuit board 142 comprises at least one of circuit traces, microcontroller, microprocessor, logic circuits, memory, network connections and hardware, and digital storage. In a preferred embodiment, the circuit board 142 comprises a logic circuit that controls motor 140 actuation. The circuit board 142 is also adaptable to connect to memory that records the number of tickets 108 remaining in a ticket compartment 112. This value is communicated to the computing device 102 and also to the numeric displays 110.

The motor 140 is triggered to dispense tickets 108 by a signal from the computing device 102 that is sent to the circuit board 142 or directly to the motor 140. The number and type of tickets 108 purchased is communicated from the computing device 102 to the ticket dispenser 100, and the appropriate tickets 108 are fed through the slot 106 so that a user, such as a cashier, may remove the tickets 108 dispensed. The dispensing of the tickets 108 preferably occurs post-sale.

In order for the ticket dispenser 100 to track the number of tickets 108 dispensed, a mechanical or digital ticket tracker is employed. In one embodiment, a barcode reader is installed inside the ticket dispenser proximate each slot 106. As tickets 108 (each one having a unique bar code) are dispensed, the barcode reader scans the barcode, registers that a ticket 108 has been removed, updates the appropriate numeric display 110, and communicates to the computing device 102 that: a ticket 108 has been removed; the barcode number of the ticket 108; the monetary value of the ticket 108; the number of tickets 108 remaining; and any other relevant ticket 108 and sales information.

In yet another embodiment, tickets 108 are tracked by optical scanners that image the colors and patterns which are unique to a particular style of ticket 108 in order to detect when a ticket 108 is removed from the dispenser 100. Another embodiment tracks the presence of perforations between tickets 108 to detect when a ticket 108 is removed from the dispenser 100.

In a preferred embodiment, the number of roller 130, 132 rotations is used to track the quantity of tickets dispensed. Since the size of tickets 108 is known, the number of rotations associated with the removal of a single ticket 108 is used to calculate the number of tickets 108 removed from the dispenser 100. In a related embodiment, the number of dispense trigger signals sent to the dispenser 100 is counted to calculate the quantity of tickets remaining in the dispenser 100.

Since tickets 108 are of varying sizes, the invention contemplates an electronic interface that is used for programming the dispenser to associate a ticket 108 size with a particular compartment 112 so that the rollers 130, 132 rotate the appropriate number of rotations so that a single ticket 108 is dispensed for a single dispense trigger signal. This interface is preferably with the computing device 102. The number of revolutions a roller 130, 132 rotates is controlled and/or measured by electronic, optical, magnetic, or mechanical means.

User Interface

Figure 8:
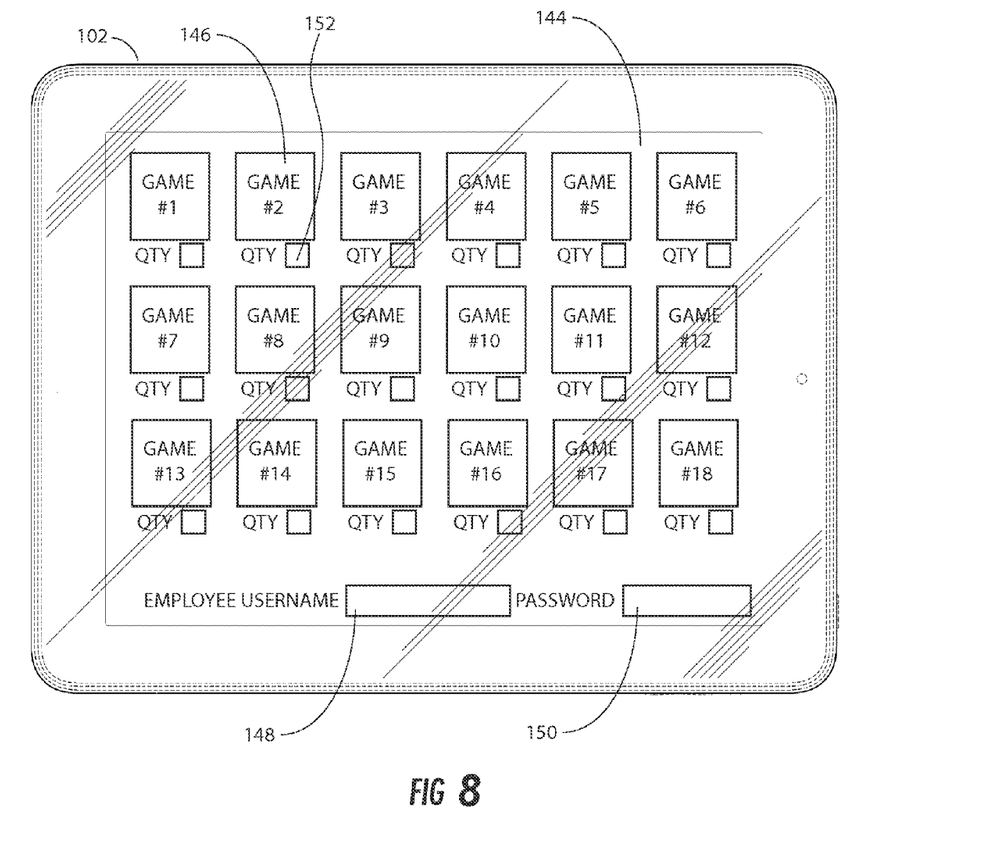
FIG. 8 illustrates an embodiment of a touch screen computing device contemplated by the invention.

With reference to FIGS. 1 and 8, a touch screen interface 144 with the computing device 102 serves to control the dispenser 100 and to display information related to the dispenser 100. The touch screen interface 144 provides a touch-sensitive screen region with text and/or graphical icons 146 that represent a particular ticket game. Touching such a screen region sends a trigger signal to the ticket dispenser 100 causing the ticket dispenser to dispense the desired number of tickets 108.

Since each state has different scratch-off ticket games and formats, the computing device 102 is programmable so that all the games a state offers can be pre-stored in memory or storage of the device. The information associated with a game includes at least the: name of game, game identifier code, ticket value, ticket dimensions, and expiration of game. An end user of the system may then simply choose from a list of available games when loading the dispenser 100 with tickets. The computing device 102 also provides fields to input ticket serial number ranges and compartment ID associated with particular fan-folds/rolls. The computing device 102 is also configured to store the identity and serial number range of non-activated ticket fan-folds/rolls. An authorized user may then simply indicate to the computing system that a particular fan-fold/roll has been activated during the ticket loading process. This feature provides a convenient ticket inventory system for end users.

In one scenario, for example, tickets 108 are sold to a customer, so a sales associate touches the desired icon 146 of the user interface 144 and this signals the ticket dispenser 100 to dispense the desired ticket(s) 108. To do so, the associate enters access credentials such as a username 148 and/or password 150 to access the user interface 144. Each authorized user has their own unique access credentials. The associate chooses the game type (represented preferably by an icon 146) and desired quantity 152 of tickets 108. The dispenser then receives the signal to dispense tickets 108, and tickets 108 are dispensed from the compartment 112 corresponding to that particular game. The number of tickets 108 displayed on the numeric display 110 is reduced by the number of tickets dispensed, which reflects the actual number of tickets 108 remaining in the dispenser 100. The inventory related to that particular game is optionally displayed on the computing device 102.

Inventory Display and Reporting

Each slot 106 that dispenses tickets 108 is associated with a different compartment 110 and roll or fan-fold of tickets, so each slot 106 has a numeric display 110 that is associated with that particular slot 106 and ticket compartment 112. The real-time quantity of tickets in each compartment 110 is displayed on the numeric displays 110. In a related embodiment, a dispenser 100 total counter is present that displays the total number of tickets remaining in the entire dispenser 100. Therefore, for inventory purposes, a user may instantly know the total number of tickets 108 in the dispenser 100 and the number of each specific type of ticket in each individual compartment 112. The computing device 102 is also configured to show dispenser 100 ticket quantities. For example, without limitation, upon the sale of a ticket, the computing device 102 and/or circuitry with the dispenser 100 calculates the updated number of tickets in stock of that particular game. The computing device 102 then records the actual number of tickets remaining in the dispenser 100, and the number of tickets remaining in dispenser is updated and displayed. At a glance, the numeric displays 110, together, convey the updated inventory of all the tickets in the dispenser 100. Additionally, the touch computing device 102 is configurable to send inventory reports to a computer, computer network, printer, email, mobile telephone networks, and mobile apps.

In another example, after a work shift is completed, a user may access the user interface 144 of the computing device 102 and display and print a record of the actual ticket inventory in the dispenser. The computing device 102 records each time a user logs on to the system, and keeps a record of each ticket that is dispensed. The record includes, inter alia: the time/date stamp the user first accessed the system with a corresponding ticket inventory broken down by compartment (i.e. begin shift inventory); the time/date stamp the user last accessed the system with a corresponding ticket inventory broken down by compartment (i.e. end shift inventory); the itemized time/date stamp of each ticket dispensed by that user and the game identity, quantity, compartment ID, and ticket ID associated with each ticket dispensed. This information may be manually reconciled against reports generated by a cash register or point of sale system. In related embodiments, this information is: saved in a local storage device; transmitted to a network; transmitted to an email account; transmitted to a remote computing device.

Besides individual user reports, the computing device 102 is configured to produce an aggregate report that shows every ticket transaction. This is available for a particular shift, day, week, month, year, or customizable time frame.

Method of Tracking Scratch-Off Lottery Ticket Inventory

Figure 9:
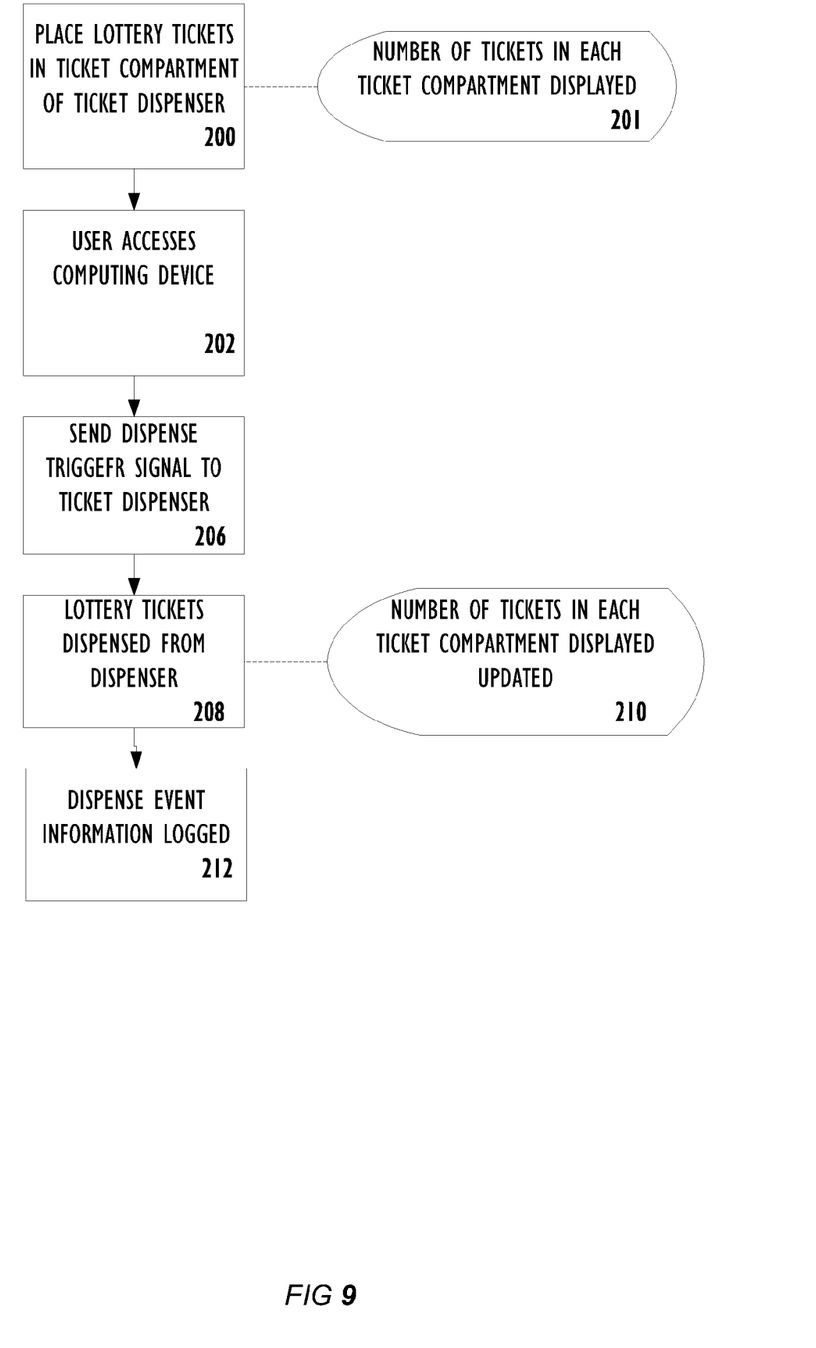
FIG. 9 illustrates a flow chart of one embodiment of a scratch-off lottery ticket dispensation method.

Turning to FIG. 9, as an example, without limitation, scratch-off lottery tickets 108 are placed 200 in the ticket dispenser 100.

The number of tickets in the ticket dispenser is displayed 201. Upon sale of a ticket, a user accesses 202 the computing device 102 and instructs the ticket dispenser 100 to dispense at least one ticket. The computing device 102 sends 206 a trigger signal to the ticket dispenser 100 causing the ticket dispenser to dispense 208 the desired number of tickets. The ticket dispenser records the actual number of tickets remaining in the dispenser 100, and the number of tickets remaining in dispenser is updated and displayed 210. The computing device 100 records 212 dispense event information, which includes at least the time/date stamp the user first accessed the system with a corresponding ticket inventory broken down by compartment (i.e. begin shift inventory); the time/date stamp the user last accessed the system with a corresponding ticket inventory broken down by compartment (i.e. end shift inventory); the itemized time/date stamp of each ticket dispensed by that user and the game identity, quantity, compartment ID, and ticket ID associated with each ticket dispensed.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

What is claimed is:

1. A scratch-off lottery ticket dispensing system comprising:
    a computing device configured to send and receive signals to a ticket dispenser, wherein at least one of the signals is a dispense trigger, and wherein the computing device is configured to record the number of scratch-off tickets sold and to log a ticket dispensation report;
    the ticket dispenser comprising a lockable ticket compartment having a size and dimension to house a plurality of scratch-off tickets, wherein the ticket compartment comprises a moveable compartment divider configured to accommodate different scratch-off ticket dimensions, wherein the ticket dispenser is configured to communicate the number of scratch-off tickets remaining in the lockable ticket compartment to the computing device;
    a slot with each ticket compartment having a size and dimension to allow at least one of the plurality of scratch-off tickets to pass therethrough;
    a dispensing mechanism with the ticket compartment;
    a motor with the dispensing mechanism that actuates the dispensing mechanism, the dispensing mechanism configured to advance at least one of the plurality of scratch-off tickets from within the ticket compartment, through the slot, to an exterior of the ticket dispenser;
    a logic circuit in communication with the motor, the logic circuit configured to control motor actuation;
    a memory with the logic circuit that records the number of scratch-off tickets advanced to the exterior of the ticket dispenser;
    an interface with the logic circuit for receiving the dispense trigger, the interface configured to actuate the motor so to dispense a scratch-off ticket to the exterior of the ticket dispenser upon receipt of the dispense trigger;
    a numeric display disposed on the exterior of the ticket dispenser; and
    means for detecting and determining the number of scratch-off tickets remaining in the lockable ticket compartment; and
    wherein the computing device is configured to record:
        a scratch-off ticket sale;
        a value indicating number of scratch-off tickets sold;
        an indication of the type of scratch-off tickets sold;
        a unique identifier of the scratch-off tickets sold;
        identification credentials of the computing device user; and
        a time stamp indicating when the scratch-off tickets were sold.

2. The scratch-off lottery ticket dispensing system of claim 1, wherein the ticket dispenser comprises a plurality of lockable ticket compartments.

3. The scratch-off lottery ticket dispensing system of claim 2, wherein each one of the plurality of lockable ticket compartments comprises an associated numeric display disposed on the exterior of the ticket dispenser, wherein each associated numeric display is configured to indicate the number of scratchoff tickets remaining in an associated ticket compartment.

4. The scratch-off lottery ticket dispensing system of claim 1, wherein the ticket dispenser comprises a metal housing.

5. The scratch-off lottery ticket dispensing system of claim 1, further comprising an interface to communicate a scratch-off ticket inventory of the ticket dispenser to a network.

6. The scratch-off lottery ticket dispensing system of claim 1, wherein the ticket dispensation report is printed.

7. The scratch-off lottery ticket dispensing system of claim 1, wherein the ticket dispensation report is sent to a network.

8. The scratch-off lottery ticket dispensing system of claim 1, wherein the lockable ticket compartment is configured to house a continuous perforated fan fold of scratch-off lottery tickets.

9. A scratch-off lottery ticket dispensing system comprising:
    a lockable ticket dispenser comprising a plurality of ticket compartments having a size and dimension to securely contain and dispense scratch-off tickets contained therein;
    means for detecting and determining the number of scratch-off tickets remaining in the lockable ticket compartment, wherein the lockable ticket dispenser is configured to dispense a scratch-off ticket upon receipt of a trigger signal, and wherein a computing device comprising a touch screen interface is configured to send the trigger signal; and
    a numeric display associated with each ticket compartment, each numeric display disposed on an exterior of the lockable automated ticket dispenser, wherein each numeric display is configured to indicate the number of scratch-off tickets remaining in an associated ticket compartment;
    wherein the lockable ticket dispenser is configured to dispense a scratch-off ticket upon receipt of a trigger signal; and
    wherein the computing device is configured to record:
        a scratch-off ticket sale;
        a value indicating number of scratch-off tickets sold;
        an indication of the type of scratch-off tickets sold;
        a unique identifier of the scratch-off tickets sold;
        identification credentials of the computing device user; and
        a time stamp indicating when the scratch-off tickets were sold.

10. The scratch-off lottery ticket dispensing system of claim 9, wherein each numeric display comprises at least one light emitting diode.

11. The scratch-off lottery ticket dispensing system of claim 9, wherein a computing device displays each numeric display.

12. A method of tracking scratch-off lottery ticket inventory comprising the steps of:
    providing a lockable ticket dispenser comprising a plurality of ticket compartments having a size and dimension to securely contain and dispense tickets from a continuous perforated fan fold of scratch-off lottery tickets contained therein;
    providing a numeric display for each ticket compartment, each numeric display disposed on an exterior of the lockable automated ticket dispenser, each numeric display configured to indicate the number of scratch-off tickets of an associated ticket compartment;
    detecting and determining the number of scratch-off tickets remaining in the lockable ticket compartment;
    providing an interface with a logic circuit for receiving the dispense trigger, the interface configured to actuate the motor so to dispense a scratch-off ticket to the exterior of the ticket dispenser upon receipt of the dispense trigger;

simultaneously displaying the number of scratch-off tickets contained in each ticket compartment; and providing a computing device is configured to record:
- a scratch-off ticket sale;
- a value indicating number of scratch-off tickets sold;
- an indication of the type of scratch-off tickets sold;
- a unique identifier of the scratch-off tickets sold;
- identification credentials of the computing device user; and
- a time stamp indicating when the scratch-off tickets were sold.

13. The method of tracking scratch-off lottery ticket inventory of claim 12 further comprising the step of sending the number of scratch-off tickets displayed on the numeric display to a network.

* * * * *